United States Patent [19]

Shimamoto et al.

[11] Patent Number: 5,300,874

[45] Date of Patent: Apr. 5, 1994

[54] INTELLIGENT POWER SUPPLY SYSTEM FOR A PORTABLE COMPUTER

[75] Inventors: Hajime Shimamoto; Yasuhiro Ishida, both of Tokyo, Japan

[73] Assignee: Kabushiki Kaisha Toshiba, Kanagawa, Japan

[21] Appl. No.: 585,581

[22] Filed: Sep. 20, 1990

[30] Foreign Application Priority Data

Sep. 29, 1989 [JP] Japan .................. 1-254963
Sep. 29, 1989 [JP] Japan .................. 1-254967

[51] Int. Cl.$^5$ ..................... G06F 1/26; H02J 7/00
[52] U.S. Cl. ................................ 320/15; 307/66; 395/750; 314/492
[58] Field of Search ................ 395/750; 320/15; 307/66; 364/492

[56] References Cited

U.S. PATENT DOCUMENTS

| | | | |
|---|---|---|---|
| 4,315,162 | 2/1982 | Ferguson | 307/66 |
| 4,323,788 | 4/1982 | Smith . | |
| 4,458,307 | 7/1984 | McAnlis et al. | 364/200 |
| 4,611,289 | 9/1986 | Coppola | 364/492 |
| 4,667,289 | 5/1987 | Yoshida et al. | 364/200 |
| 4,670,661 | 6/1987 | Ishikawa | 307/66 |
| 4,694,237 | 9/1987 | Hanson | 320/6 |
| 4,698,578 | 10/1987 | Mullersman et al. | 320/13 |
| 4,757,505 | 7/1988 | Marrington et al. | 371/66 |
| 4,779,050 | 10/1988 | Ohnari | 324/426 |
| 4,816,736 | 3/1989 | Dougherty et al. | 320/17 |
| 4,851,756 | 7/1989 | Schaller | 320/3 |
| 4,860,185 | 8/1989 | Brewer et al. | 363/41 |
| 4,868,832 | 9/1989 | Marrington | 371/66 |
| 4,885,521 | 12/1989 | Crampton | 320/14 |
| 4,926,365 | 5/1990 | Hsieh | 364/708 |
| 4,965,462 | 10/1990 | Crawford | 307/66 |
| 4,984,185 | 1/1991 | Saito | 364/707 |
| 5,012,406 | 4/1991 | Martin | 364/200 |
| 5,039,928 | 8/1991 | Nishi et al. | 320/2 |
| 5,057,383 | 10/1991 | Sakira | 429/92 |
| 5,058,045 | 10/1991 | Ma | 364/708 |

FOREIGN PATENT DOCUMENTS

0273322 12/1987 European Pat. Off. .
0335316 3/1989 European Pat. Off. .

OTHER PUBLICATIONS

Toshiba T1600 Portable Personal Computer User Manual.
Toshiba T5100 Portable Personal Computer Refefence Manual.
Toshiba T5200 Portable Personal Computer Reference Manual.
European Search Report completed May 20, 1992 by Examiner Piero Bravo at The Hague.
"Linear supplies are inefficient compared wtih switching supplies" 2119 E.D.N. Electrical Design News vol. 28 (1983) Sep., No. 19, Boston, Massachusetts, USA, EDN Sep. 15, 1983, pp. 198–208.
U.S. application Ser. No. 541,978, filed Jun. 22, 1990, inventors: Nobuyuki Nanno et al., entitled: "A Power Supply Control System for a Portable Computer".

*Primary Examiner*—Dale M. Shaw
*Assistant Examiner*—C. Shin
*Attorney, Agent, or Firm*—Finnegan, Henderson, Farabow, Garrett & Dunner

[57] ABSTRACT

An intelligent power supply system for a portable computer, the computer having a central processing unit (CPU), and being operable in response to power supplied from at least two chargeable batteries or an alternating current (AC) adapter, includes means for detachably coupling the batteries to the computer and a PC-CPU for controlling power supply independent of the CPU. The PC-CPU has means for receiving battery select information for controlling power supply and generating a control signal. The power supply system further includes battery control circuit means, connected to the AC adapter and the batteries, for selecting and controlling the AC adapter or one of the batteries based on the control signal. Accordingly, the proper battery for the usage can be installed in the portable computer operable on battery power, and the computer can be operated continuously on the battery power for a long period of time.

11 Claims, 4 Drawing Sheets

INTELLIGENT POWER SUPPLY SYSTEM FOR A PORTABLE COMPUTER

BACKGROUND OF THE INVENTION

The present invention is directed to an ordinary computer, and, particularly, to a portable computer operable on an internal battery. More particularly, the present invention relates to a system and a method of providing concentrated management of the power supply of the portable computer.

Various types of portable computers operable on an internal battery have recently been developed. This type of computer needs to always recognize the power status of a driving power and the statuses of individual units of the computer in both cases where an AC adapter is used and where an internal battery is used. It is also necessary to eliminate various problems originated from power failure including the lower usable state of the internal battery (hereinafter called low battery status) when power is supplied from the battery.

The present applicant has proposed one example of such a portable computer which is disclosed in the prior application Ser. No. 541,978. In brief, according from the disclosed computer, the battery power supply is constituted of a single main battery detachable to the body of the portable computer and an exclusive power controller CPU (PC-CPU) is used to control the charging of the main battery with the power supplied from an AC adapter. According to the portable computer disclosed in the above application, however, the PC-CPU controls a single battery power supply. When a liquid crystal display with a back light (EL-LCD), a plasma display (PDP) or the like is driven on power from the AC adapter, it is always necessary to supply power to the battery via the AC adapter in light of the power dissipation of the display. In addition, a large-capacity battery needs to be installed in the body of the computer. This significantly increases the weight of the overall computer, deteriorating the portability and hindering continuous battery driving over a long period of time.

SUMMARY OF THE INVENTION

It is therefore an object of the present invention to provide a battery power supply constituted of at least two main batteries detachable from the body of a computer and to use one of the main batteries a driving power supply at the time the computer is driven on the battery power.

It is another object of the present invention to provide a spare battery to ensure continuous battery driving for a long period of time.

It is a further object of the present invention to detect low battery status at the time an AC adapter is used and inform a user that continuous driving on battery power is not possible by means of an alarm.

In accordance with the present invention, the foregoing objects, among others, are achieved by providing an intelligent power supply system for a portable computer, the computer having a central processing unit (CPU), and being operable in response to power supplied from at least two chargeable batteries or an alternating current (AC) adapter, comprising:

means for detachably coupling the batteries to the computer;

a power control microprocessor independent of the CPU for controlling power supply, the microprocessor having means for generating a control signal based on battery select information for controlling the power supply; and battery control circuit means, connected to the AC adapter and the batteries, for selecting the AC adapter or one of the batteries based on the control signal from the power control microprocessor.

Other objects, features, and advantages of the present invention will become apparent from the following detailed description. It should be understood, however, that the detailed description and specific examples while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Other objects and features of the present invention will be apparent from the following description taken in connection with the accompanying drawing, in which.

DETAILED DESCRIPTION OF THE PREFERRED EMBODIMENTS

A preferred embodiment of this invention will now be described with reference to the accompanying drawings.

Figure 1:
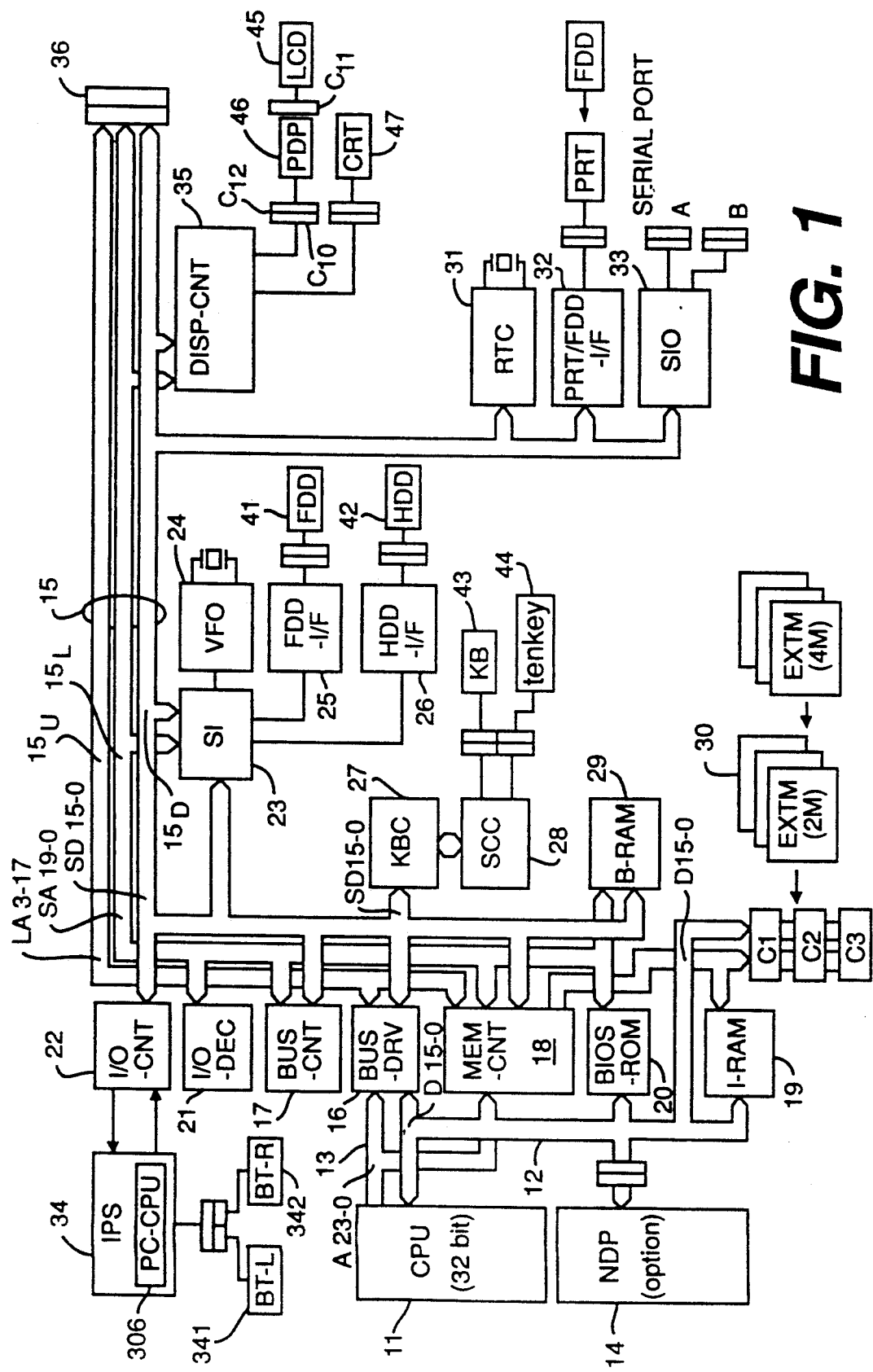
FIG. 1 is a schematic block diagram illustrating an intelligent power supply system with a power control CPU for use in a computer system, according to one embodiment of this invention.

Referring to FIG. 1, a main CPU 11, which is realized by, for example, a 32-bit CPU chip, performs the general control of the system. In an Initial Reliability Test (IRT) process at the power-on time, the main CPU 11 accesses to a power control CPU (PC-CPU), which will be described later, to read out information of a power supply status and determine whether or not the driving power is normal. Internal buses 12 and 13 are connected to the CPU 11; the bus 12 is an internal data bus having a 16-bit width and the bus 13 is an internal address bus having a 24-bit width. A numerical data processor 14 is an optional unit which is to be selectively connected via a connector to the internal data bus 12. A system bus 15 includes a 16-bit wide data bus 15D, a 20-bit wide lower address bus 15L and a 7-bit wide upper address bus 15U. A bus driver (BUS-DRV) 16 serves as an interface to connect the internal buses 12 and 13 to the system bus 15. A bus controller (BUS-CNT) 17 controls the system bus 15. A memory controller (MEM-CNT) 18 controls address transfer between the address bus 13 and the address buses 15U and 15L, and controls the read/write operation of a main memory (I-RAM) 19. That is, the main memory 19 is accessed by an address control executed by the memory controller 18. A BIOS-ROM 20 stores a basic input/output program (BIOS). When power for the system is thrown, the IRT is executed.

An I/O decoder (I/O-DEC) 21 decodes an I/O address on the system bus 15 and gives the decoded address to an associated I/O chip. An I/O controller (I/O-CNT) 22 performs the input/output control of I/O data. A super integration IC (SI) 23 includes various I/O controllers, such as a floppy disk interface, hard disk interface, a DMA controller and an interrupt controller. A frequency oscillator (VFO) 24 generates a sync clock for a floppy disk drive (FDD). A floppy disk drive interface (FDD-I/F) 25 is an interface for the floppy disk drive. A hard disk drive interface (HDD-I/F) 26 is provided with an interface register for selectively setting an HDD motor OFF command (MSC) in the initialization routine shown in FIG. 3A. A keyboard controller (KBC) 27 processes key-in data entered from a keyboard 43 and/or a numeric pad or tenkey 44. A keyboard scan controller (SCC) 28 scans key-in data from the keyboard 43 and tenkey 44.

Figure 2:
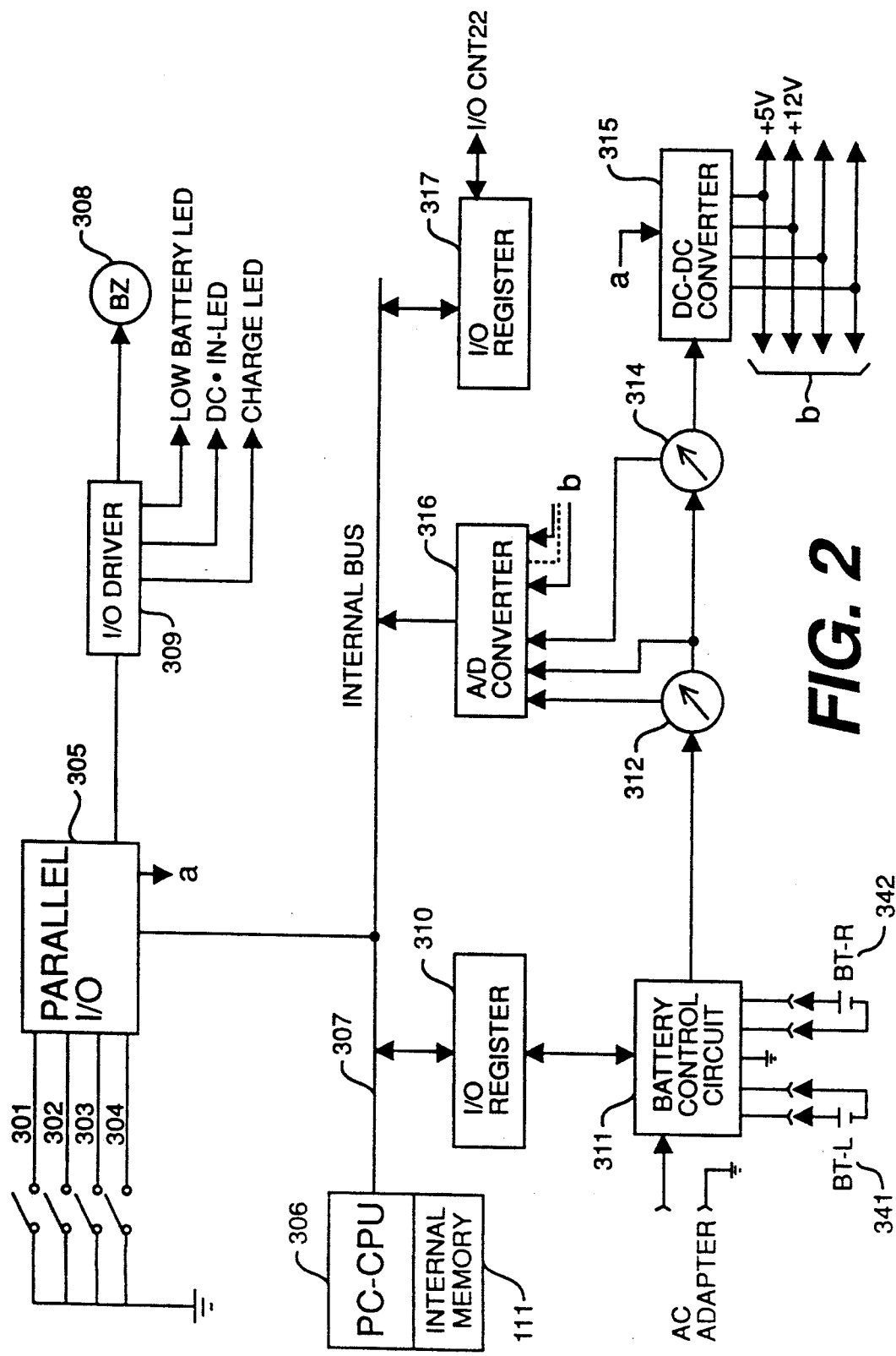
FIG. 2 is a diagram illustrating the power control CPU shown in FIG. 1.
Figure 3A:
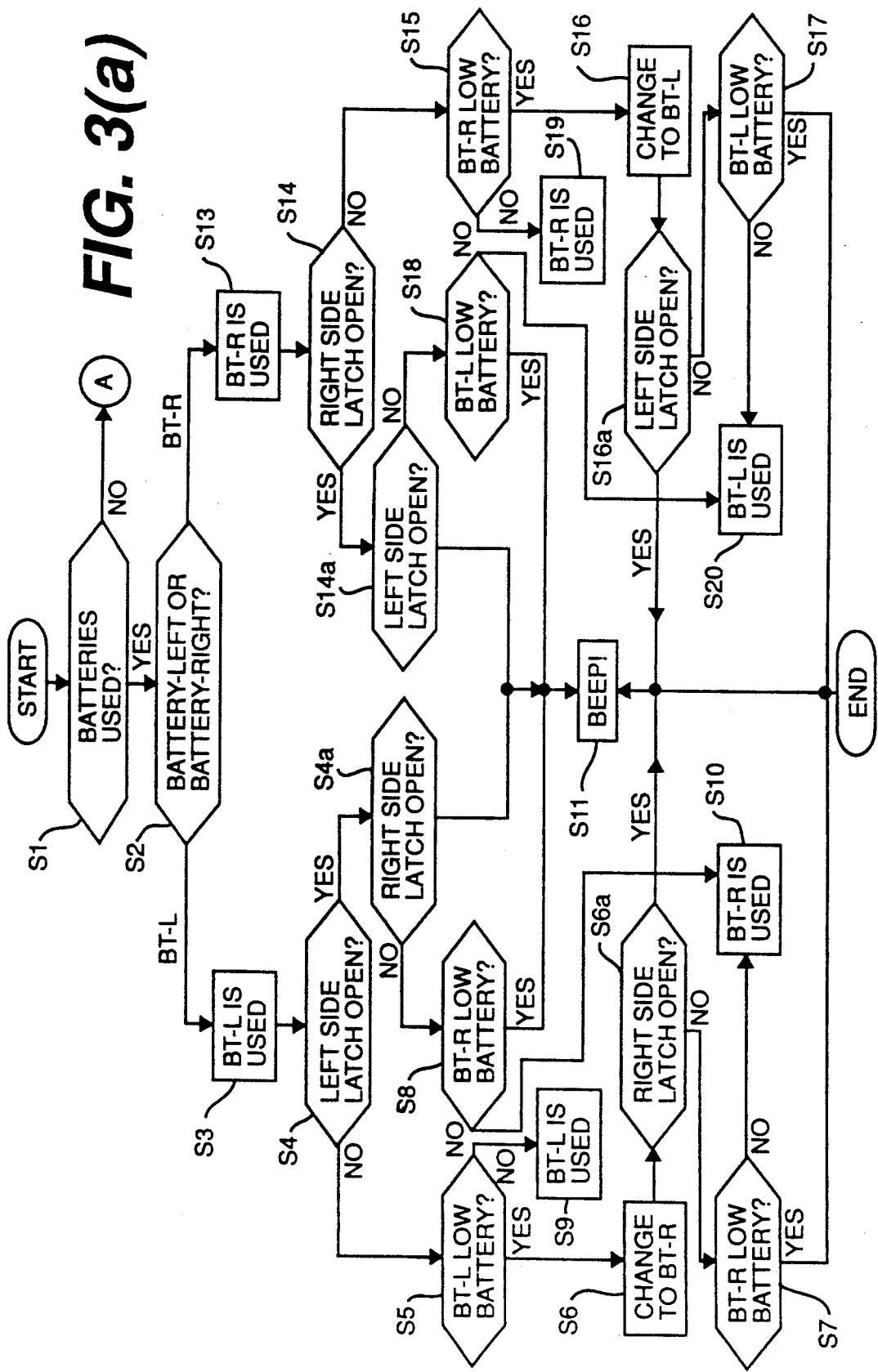
FIGS. 3A and 3B are flowcharts illustrating sequences concerning the battery check at power-on time, which are performed by the power control CPU.
Figure 3B:
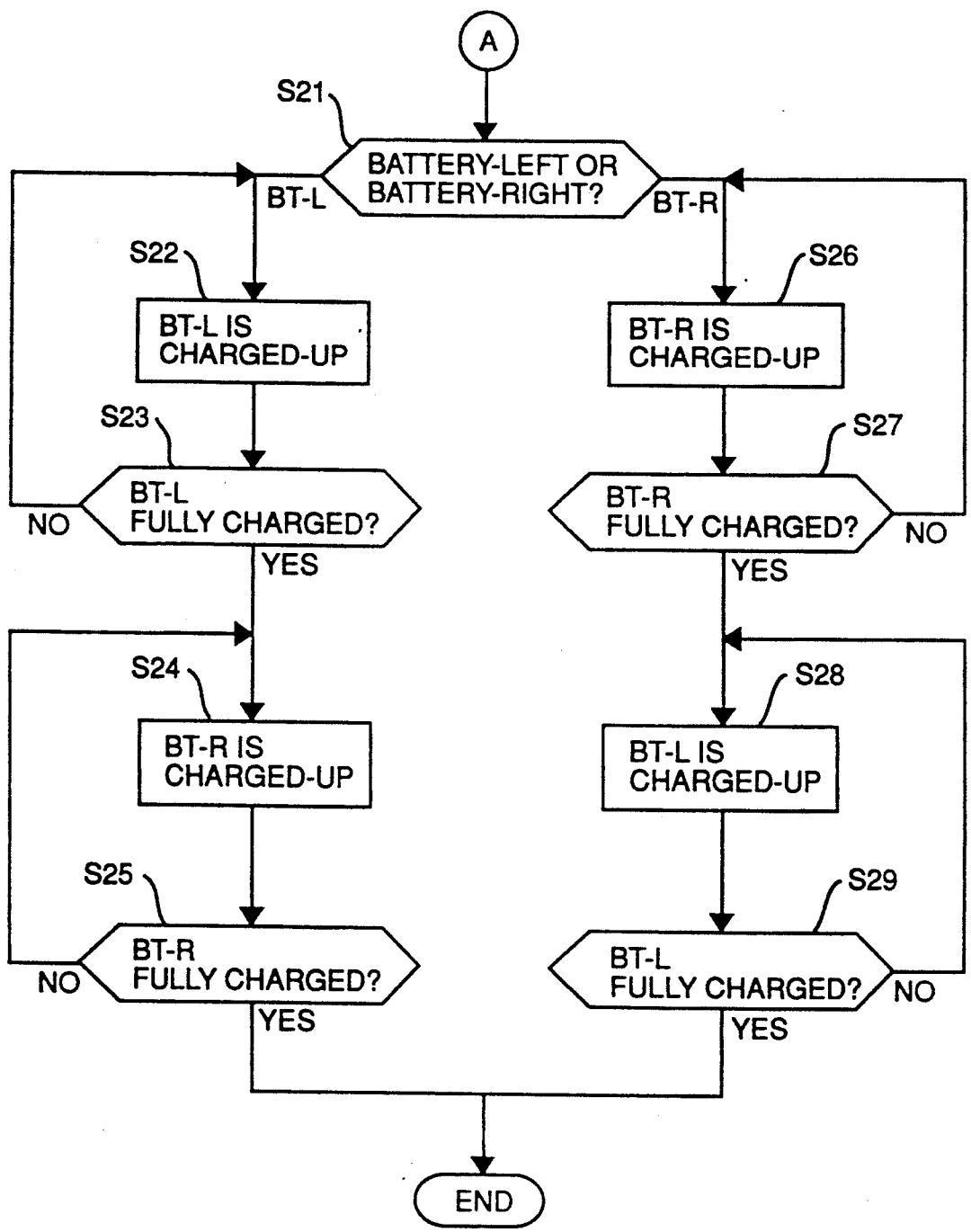

A backup RAM (B-RAM) 29 is used as a memory at the time a resume function or the like is executed. An extension memory card (EXTM) 30 is arbitrarily connected to extension memory connectors C1, C2 and C3. A time module (RTC: Real-Time Clock) 31 has a built-in, exclusive drive battery and a built-in memory (CMOS-RAM) which is backed up by the battery. The CMOS-RAM stores set-up data set on a set-up screen or the like. An I/O port (PRT/FDD-IF) 32 is for connection of an I/O device, such as an external floppy disk drive (FDD) or a printer (PRT). A serial I/O interface (SIO) 33 is connected with an RS-232C interface unit or the like. An intelligent power supply (IPS) 34 having a built-in power control CPU (PC-CPU) 306 comprising a microprocessor controls the supply of driving power to the computer. In this embodiment, two main batteries (BT-L341, BT-R342) are detachably coupled and various driving powers are controlled by the PC-CPU 306. Information of each battery's power status in the IPS 34 is sent via the I/O-CNT 22 to the CPU 11. FIG. 2 illustrates the internal structure of the IPS 34. FIGS. 3A and 3B illustrates a sequence of battery checking processes conducted by the PC-CPU 306 provided in the IPS 34.

A display controller (DISP-CNT) 35 performs the display control of a so-called flat panel display, such as a plasma display (PDP), a liquid crystal display (LCD), or a color panel (color LCD), which is a display subsystem in the computer, and a CRT display. An extension connector 36 is for connection of various extension modules, such as an extension display controller (display subsystem). An FDD 41 is incorporated in the computer and is connected to the FDD-I/F 25. An HDD 42, which is also incorporated in the computer, is connected to the HDD-I/F 26. The keyboard unit (KB) 43 and tenkey pad 44 are connected to the SCC 28. The display controller 35 is connected with an LCD 45 with a back light, a PDP 46 or a CRT 47.

The internal structure of the IPS 34 will be described below referring to FIG. 2. A power switch 301, a reset switch 302, a display switch 303 and an extension unit switch 304 each have one end grounded and the other end connected to an parallel I/O 305. These switches are used to set the system ready for operation. The parallel I/O 305 holds the statuses of the individual switches 301 to 304 and set information of the PC-CPU 306, which will be described later. The PS-CPU 306 is a power control microprocessor, which receives information of individual sections of the power supply circuit and instruction information from the main CPU 11 through an internal bus 307. The PC-CPU 306 controls power supply to the individual sections of the computer based on the instruction from the CPU 11, the internal status, the external operational status, etc. In this embodiment, the PC-CPU 306 has a battery checking function as illustrated in FIG. 3. A buzzer (BZ) 308 is driven through the parallel I/O 305 and an I/O driver 309 under the control of the PC-CPU 306. In a case where the computer system is driven on battery power, when the battery serving as a driving power supply is in a low battery status and a battery not in use is also in a low battery status or is unconnected, the buzzer intermittently generates an alarm sound. The I/O driver 309 controls a power-ON status and operation speed indicating LED, a low battery status indicating LED, an AC adapter connection indicating LED and the buzzer 308 under the control of the PC-CPU 306. An I/O register 310 is used for data transfer between the PC-CPU 306 and a battery control circuit 311 to be described later. The battery control circuit 311, which is connected via the I/O register 301 and internal bus 307 to the PC-CPU 306, selectively controls the battery in use and charging battery. A current detector 312 detects the total current in the IPS 34 including charge currents of the BT-L341 and BT-R342. A current detector 314 detects a current flowing through the circuits in the IPS 34 (excluding the backup current). A DC-DC converter 315 generates power for driving the individual sections of the computer from the AC adapter power or main battery power coming through the current detector 314. An A/D converter 316 performs analog/digital conversion in order to supply the detected current values of the current detectors 312 and 314, the output voltages of the main batteries, the output voltage of the DC-DC converter 315, etc. as digital data to the PC-CPU 306. An I/O register 317, connected to the I/O-CNT 22, is used for information transfer between the PC-CPU 306 and the main CPU 11.

Referring to the aforementioned diagrams, the battery checking operation executed by the PC-CPU 306 will be described below. The battery checking routine is illustrated in FIGS. 3A and 3B.

The PC-CPU 306 of the IPS 34 always monitors the operational status of the power switch 301. In other words, the PC-CPU 306 executes a power-OFF routine when the computer system is in a power-OFF status, and executes the battery checking routine as shown in FIG. 3A when the computer system is in a power-ON status.

In the battery checking process, first it is discriminated whether or not the computer system is driven on the power from the AC adapter (step S1). When the computer system is driven on the AC adapter power, the flow advances from step S1 to a charging process (steps S21-S29) shown in FIG. 3B. When the computer system is driven on the power from the battery, on the other hand, it is discriminated from which battery (BT-L341 or BT-R342) the power is supplied, from the content of the battery-backed-up internal memory built in PC-CPU 306 111 of PC-CPU 306 shown in FIGS. 1 and 2. If the battery BT-L341 is supplying the power, the status of the connection of this battery and its low battery status are recognized from current and voltage value output from the supplying battery (steps S2-S5). If the battery BT-R342 is supplying the power, on the other hand, the status of the connection of this battery and its low battery status are recognized (steps S13-S15). In other words, it is determined whether or not the power-supplying battery is connected to the computer system from the latched status of the battery unit in the battery receiving section of the computer system. It is also determined whether or not the power-supplying battery is in a low battery status.

When the power-supplying battery is not judged to be in the low battery status, the power from the power-supplying battery is output as driving power through the I/O register 310 and battery control circuit 311 (steps S9 and S19). When the PC-CPU 306 detects the low battery status, it switches the power-supplying battery to the other battery and determines the low battery status of the switched battery. If it is determined that the new battery is not in the low battery status, the power of this battery is output as driving power (steps S6, S7 and S10; and S16, S17 and S20). When it is determined through the latch state discrimination process (steps S4 and S14) that the latch on the power-supplying battery side is open, it is then determined whether the auxiliary battery is installed in the computer system and whether it is in a low battery status. The steps of determining whether the auxiliary battery is installed in the computer are represented as steps S4a, S6a, S14a, and S16a of the battery checking process shown in FIG. 3a. If the auxiliary battery is usable, this battery is used as a power-supplying battery and its power is output as driving power (steps S8 and S10; and S18 and S20).

When the latch of the power-supplying battery is determined to be open in steps S4, and S14 and the auxiliary battery is not installed in the computer system or in a low battery status, it is then considered that a continuous operation on the battery power is not possible. When the PC-CPU 306 make this decision, it controls the buzzer 308 through the parallel I/O 305 and I/0 driver 309 to generate a beep sound to inform an operator that a continuous operation on the battery power is not possible (steps S8, S18 and S11).

If it is discriminated in the aforementioned step S1 that the power is coming from the AC adapter, the PC-CPU 306 determines which battery should be charged from the content of the internal memory, and charges the battery until it is fully charged, as shown in FIG. 3(b). When the battery becomes fully charged, another battery is charged to the full state. When the latter battery becomes fully charged, the charging process is terminated (steps S21–S29). If both batteries are fully charged, the charging operation will not be executed.

With the arrangement of the present invention, the PC-CPU 306 performs battery control of two main batteries (BT-L and BT-R). That is, when the PC-CPU 306 recognizes the charged status of each battery and detects that power is not supplied from the AC adapter and battery switching is not possible, the PC-CPU 306 informs the operator of this event by means of an alarm. Accordingly, the operator can recognize, without overlooking, that the continuous operation on the battery power is not possible.

The use of two main batteries (BT-L and BT-R) permits alternate use of sufficiently charged batteries. When the computer system is driven on the power from the AC adapter, it is possible to successively charge the batteries one at the time. Further, providing a spare battery allows for continuous battery driving for a long period of time, and can divide the charge current, thus ensuring a compact and small-capacity AC adapter.

The PC-CPU 306 can control the driving of that battery which is presently supplying power to the computer system, and at the same time, can control charging of the other, auxiliary battery when the auxiliary battery is not fully charged. Immediately upon detection of an abnormal status while monitoring the status of the battery connection and the charging status of the batteries, the PC-CPU 306 informs this abnormal status by an alarm.

Numerous modifications and variations of the present invention are possible in light of the above teachings. It is therefore to be understood that, within the scope of the appended claims, the present invention can be practiced in a manner other than as specifically described herein.

What is claimed is:

1. An intelligent power supply system for a portable computer, the computer being operable in response to power supplied to a power input from at least two rechargeable batteries or an alternating current (AC) adapter, comprising:
   means for receiving each of said batteries in a respective one of at least two battery receiving sides of a battery receiving section within said computer;
   means, coupled to said receiving means, for latching each of said batteries into a respective one of said battery receiving sides;
   means for providing selection information indicating which one of said battery receiving sides has been used to supply power to said power input before power-up of said portable computer;
   selecting means for selecting one of said battery receiving sides indicated by said selection information;
   detection means, responsive to said selecting means, for detecting whether the selected battery receiving side latches one of said batteries, and whether a charge of a battery latched by said selected battery receiving side is above a predetermined level;
   control means, responsive to said detection means, for indicating the selected battery receiving side in the event that said selected battery receiving side latches one of said batteries and the charge of the battery latched in said selected battery receiving side is above said predetermined level; and
   battery control circuit means, responsive to said control means, for supplying power to said power input from a battery receiving side indicated by said control means.

2. The intelligent power supply system according to claim 1, further comprising an I/O register for transferring data from said control means to said battery control circuit means, said data identifying said indicated battery receiving side.

3. The intelligent power supply system according to claim 1, wherein the detection means includes:
   at least one current detector for measuring a value of output current of said latched battery for detecting said charge; and
   A/D converter means for performing analog-to-digital conversion of an output current value detected by the current detector and for outputting a digital value for detecting said charge.

4. The intelligent power supply system according to claim 1, further comprising:
   second selecting means for selecting a second one of said battery receiving sides in the event that said selected battery receiving side does not latch one of said batteries or the charge of the battery latched by said selected battery receiving side is below said predetermined level;
   second detection means, responsive to said second selecting means, for detecting whether said selected second battery receiving side latches one of said batteries, and whether a charge of the battery latched by said selected second receiving side is above said predetermined level;

second control means, responsive to said second detection means, for indicating the battery receiving side selected by said second selecting means in the event that said selected second battery receiving side latches one of said batteries and the charge of the battery latched in said selected second battery receiving side is above said predetermined level, wherein said battery control circuit means includes means, responsive to said second control means, for supplying power to said power input from a battery receiving side indicated by said second control means.

5. The intelligent power supply system according to claim 1, further comprising:

second detection means, for detecting whether said AC adapter is connected to said power input;

means, responsive to said second detection means, in the event said AC adapter is connected to said power input, for charging a battery latched in a battery receiving side indicated by said selection information.

6. The intelligent power supply system according to claim 5, further comprising:

charge detection means, responsive to said charging means, for detecting whether the charged battery is fully charged; and means, responsive to said charge detection means, in the event said charged battery is fully charged, for charging a battery latched in another of said battery receiving sides from said AC adapter.

7. A method for controlling a power supply of a portable computer operable in response to power supplied to a power input from at least two rechargeable batteries or an alternating current (AC) adapter, said computer including at least two battery receiving sides of a battery receiving section within said computer for detachably coupling said at least two rechargeable batteries to the computer, the method comprising the steps of:

detecting whether power is supplied to said power input from the AC adapter;

providing selection information to indicate which one of said battery receiving sides has been used to supply driving power to said computer before a power-on time of said computer;

selecting, in the event that power is not supplied from the AC adapter, one of said battery receiving sides indicated by said selection information;

detecting whether the selected battery receiving side is coupled to one of said batteries;

detecting, in the event that said selected battery receiving side is coupled to one of said batteries, whether a charge of the battery coupled to said selected battery receiving side is above a predetermined level;

indicating, in the event that the charge of the battery coupled to said selected battery receiving side is above said predetermined level, said selected battery receiving side as a power supplying battery receiving side; and supplying power to said power input, in the event that power is not supplied to said power input from said AC adapter, from the battery receiving side indicated as the power supplying battery receiving side.

8. The method according to claim 7, further comprising the steps of:

selecting, in the event said selected battery receiving side is not coupled to one of said batteries or the charge of a battery coupled to said selected battery receiving side is below said predetermined level, a second one of said battery receiving sides;

detecting whether said selected second battery receiving side is coupled to one of said batteries and whether a charge of a battery coupled to said selected second battery receiving side is above said predetermined level;

indicating, in the event that said selected second battery receiving side is coupled to one of said batteries and the charge of the battery coupled to said selected second battery receiving side is above said predetermined level, said selected second battery receiving side as a power supplying battery receiving side.

9. The method according to claim 8, further comprising the step of:

generating a user-sensible alarm when said selected second one of said battery receiving sides is not coupled to one of said batteries or the charge capacity of the battery coupled to said selected second one of said battery receiving sides is below said predetermined level.

10. The method according to claim 7, further comprising the step of:

charging, in the event that power is supplied to said power input by said AC adapter, a battery coupled to a battery receiving side indicated by said selection information from said AC adapter.

11. The method according to claim 10, further comprising the steps of:

detecting whether the charged battery is fully charged; and charging, in the event said charged battery is fully charged, a battery coupled to another of said battery receiving sides from said AC adapter.

* * * * *